United States Patent [19]

Bracco

[11] 4,088,792
[45] May 9, 1978

[54] LOW CALORIE DESSERT

[75] Inventor: Umberto Bracco, La Tour-de-Peilz, Switzerland

[73] Assignee: Societe d'Assistance Technique pour Produits Nestle SA (Nestec), La Tour-de-Peilz, Switzerland

[21] Appl. No.: 606,429

[22] Filed: Aug. 21, 1975

[30] Foreign Application Priority Data

Sep. 6, 1974 Switzerland .................... 12126/74

[51] Int. Cl.$^2$ ............................................. A23L 1/187
[52] U.S. Cl. .................................... 426/250; 426/578; 426/661; 426/804
[58] Field of Search ............... 426/256, 321, 549, 550, 426/, 573, 578, 579, 588, 615, 629, 631, 639, 658, 661, 804, 519

[56] References Cited

U.S. PATENT DOCUMENTS 1,841,184  1/1932  Johnson ................................ 426/519
3,219,454  11/1965  Howard ............................... 426/658

OTHER PUBLICATIONS

Perry's Chemical Engineer's Handbook (4th ed), McGraw-Hill, 1963.
Condensed Milk and Milk Powders (6th ed), 1946, p. 5, Hunziker, published by Author, La Grange, Ill.

Primary Examiner—Jeanette M. Hunter
Attorney, Agent, or Firm—Kenyon, Kenyon, Reilly, Carr & Chapin

[57] ABSTRACT

An edible cream of low calorie content, wherein an aqueous medium containing from 50 to 90% by weight of water and, based on dry materials, from 10 to 35% by weight of amylaceous materials, at least 5% by weight of proteins, at least 5% by weight of fats, of which at least 1% are emulsifying fats, and if desired sugar is homogenized under a pressure of at least 100 atmospheres, after which the homogenisate obtained is heated at a temperature in the range from 80° C to 130° C for a period which varies according to the temperature but which is not less than 10 minutes.

20 Claims, No Drawings

LOW CALORIE DESSERT

This invention relates to a process for the production of an edible cream of low calorie content, and to the edible cream obtained by this process.

Edible compositions of low calorie content may consist of ingredients which, on their own, have only a low "calorie" value, for example sugar substitutes, such as saccharine. They may also contain ingredients which have a substantial calorie value, but in sufficiently reduced quantities. In other words, compositions of this kind have to have a particularly low dry material content.

Thus, it can readily be appreciated that compositions of this type are generally in the form of a material with a more or less fluid consistency or with a very "loose" structure of the porous or spongy type. For example, U.S. Pat. No. 2,883,286 describes an edible composition, namely a chocolate mousse, which although having a highly aerated structure has a water content not exceeding 48%. The production of a creamy consistency normally involves the use of a particular additive known as a thickener. For example, U.S. Pat. No. 3,418,133 describes a composition of low calorie content which, although having an unctuous consistency, has a high water content and in which the thickener is a carboxy methyl cellulose.

In the absence of any additive, however, it is possible to obtain a creamy consistency by utilising the gelling properties of certain starches. For example, French Pat. No. 1,574,091 describes the production of creams or puddings from a starch which contains a very high proportion of amylose and which only gels at temperatures above 130° C. French Pat. No. 1,564,417 describes the production of creams from a starch which has been treated with a polyfunctional reactant and which gels at 110° C.

The present invention relates to a process for the production of an edible cream of low calorie content, in which an aqueous medium containing from 50 to 90% by weight of water and, based on dry materials, from 10 to 35% by weight of amylaceous materials, at least 5% by weight of proteins and at least 5% by weight of fats, of which at least 1% consists of emulsifying fats, is homogenised under a pressure of at least 100 atmospheres, after which the homogenisate obtained is heated at a temperature of from 80° to 130° C for a period which varies according to the temperature but which is not less than 10 minutes.

In the context of the invention, amylaceous materials include natural starch or materials of the starch type having a molecular weight at least equal to the molecular weight of starch. Accordingly, amylaceous materials in the context of the invention are essentially starch itself (irrespective of its origin), untreated and unmodified, and higher polysaccharides equivalent to starch. For example, it is possible to select the amylaceous materials from vegetable cakes, such as cocoa cakes or peanut cakes, or fruit purees or pulps which contain an abundance of higher saccharides with a more or less fibrous texture.

The proteins may be of vegetable or animal origin. Suitable vegetable proteins include the extracts of soya protein, peanut protein, etc., whilst suitable animal proteins include lactic solids, for example skimmed milk powder (which contains approximately 35% of proteins), caseinates or isolates of fish proteins.

The fats may also be of vegetable or animal origin, for example coconut fats, lactic fats. Of these fats, at least a proportion will be emulsifying fats such as, for example, monoglycerides, glycerolactopalmitate, lecithins, etc.

Although not absolutely essential, the aqueous medium may contain, in addition to the amylaceous materials, proteins and fats, other edible substances such as sugars, especially glucose, fructose, saccharose, lactose, and flavourings, colorants, fruits in particulate form, various mineral substances, etc. In addition, a preservative, for example an anti-mold agent, such as potassium sorbate, may be added to the aqueous medium in quantities of from 100 to 400 ppm, based on the dry materials.

In one preferred variant of the process according to the invention, the aqueous medium subjected to homogenisation contains from 50 to 90% by weight of water and, based on dry materials, from 10 to 35% by weight of amylaceous materials, from 5 to 25% by weight of proteins, from 5 to 35% by weight of fats, of which 1 to 11% are emulsifying fats, and from 20 to 55% by weight of sugars.

The following represent preferred ingredients:
amylaceous materials: cocoa cakes, purees or pulps of fruits
proteins: powdered skimmed milk, sodium caseinate, fat-extracted soya flours, isolates of fish proteins
fats: stearins from coconut, refined coconut, vegetable oils, animal fats
emulsifying fats: monoglycerides, glyceropalmitate, lecithins
sugars: saccharose, glucose, fructose, lactose The starting aqueous medium may be treated by the addition in water of various ingredients in dry form either individually or in admixture. These additional ingredients may also be added, either individually or in combination, in the form of solutions or emulsions, for example a syrup of sugar, whey (lactose, serum products, salts), a solution of proteins, etc. This aqueous medium is then homogenised under a pressure of at least 100 atmospheres, for example under a pressure of from 100 to 250 atmospheres. Homogenisation is with advantage carried out at a temperature at which the fats are molten, i.e. at a temperature normally above 60° C, for example at a temperature in the range from 70° to 90° C. The homogenisate obtained is in the form of a slightly clouded, stable emulsion which, under the effect of the heat treatment, thickens until it acquires the consistency of a cream. The minimum temperature at which thickening occurs is of the order of 80° C. In addition, it is preferred not to exceed a temperature of approximately 120° C to prevent the composition from assuming a burnt taste. The heating time and temperature are of course interrelated. For example, a heating time of 12 minutes is sufficient for a temperature of 115° C, whereas a heating time of 30 minutes will be required for a temperature of 80° C.

In one preferred embodiment of the process, the homogenisate is poured into containers which are hermetically sealed and is then subjected to the heat treatment in these containers for a period of 12 minutes at a temperature of 115° C. In this way, the creams obtained are sterile and will keep for several months.

The edible cream obtained by the process according to the invention is homogeneous and stable. Its viscosity, comparable with that of an ordinary commercial cream, is of the order of 1.6 to 2.1 poises. Some typical viscosities are quoted by way of comparison below:

| | |
|---|---|
| Water at 20° C | $10^{-2}$ poises |
| glycerol at 20° C | $1.5 \cdot 10^{-2}$ poises |
| glycerol at 0° C | $1.5 \cdot 10^{-1}$ poises |
| cows natural cream at 20° C | 1 poise |
| edible cream according to the invention | 1.6 to 2.1 poises |
| mayonnaise | 2 to 3 poises |
| cane sugar molasses | $3 \cdot 10^4$ poises |
| wax | $5 \cdot 10^6$ poises |

The edible cream cannot be whipped or beaten, the increase in volume being negligible.

In addition, it is remarkable that the viscosity of this cream does not vary to any significant extent either in dependence upon the percentage of dry materials present in it or in dependence upon temperature or time (storage time).

Finally, the cream according to the invention has a remarkably low calorie content. Thus, the preferred creams which contain sugar have a calorie content of from 50 to 250 cal/100 g as against the calorie content of approximately 400 cal/100 g of a conventional cream. By way of comparison, 30 cal/100 g represents the calorie content of salad cream and 600 cal/100 g the calorie content of chocolate.

The process according to the invention is illustrated by the following Examples in which percentages are expressed in percent by weight.

EXAMPLES

An aqueous medium whose characteristics are set out in the Table following the Example is prepared by mixing with moderate stirring.

This medium is then preheated to 70° C and subsequently introduced into a Manton-Gaulin disc homogeniser operating under a pressure of 150 atmospheres and at a temperature of 70° C. A stable liquid emulsion is collected at the output end of the homogeniser, being poured into tin cans with a capacity of 300 ml. These cans are then heat-treated in a Rotomat steriliser for 12 minutes at a temperature of 115° C. After cooling (time 0), some of the cans are opened and are found to contain a firm mass which forms a very pleasant-tasting cream which compares favourably with standard commercial creams.

In addition, storage tests carried out at various temperatures do not reveal any significant changes in texture, as shown in the following Table, the taste remaining unchanged.

| Storage temperature | Viscosity in poises | | Shear limit in dynes/cm$^2$ | |
|---|---|---|---|---|
| | time 0 | after 1 month | time 0 | after 1 month |
| 4° C | 1.8 ± 0.5 | 2.1 ± 0.3 | 250 | 297 |
| 15° C | 1.8 ± 0.5 | 1.6 ± 0.4 | 250 | 300 |
| 20° C | 1.8 ± 0.5 | 1.7 ± 0.3 | 250 | 320 |

The following Table shows all the characteristics of the aqueous mediums of Examples 1 to 8, all of which have been treated in accordance with the foregoing description.

| Ingredients | in % | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| cocoa cake | 6.90 | 3.20 | — | 7.10 | 5.70 | 5.20 | — | 4.40 |
| prune puree | — | — | — | — | — | — | 34.20 | — |
| banana puree | — | — | 40.00 | — | — | — | — | — |
| skimmed milk powder | 3.20 | 1.10 | 2.10 | — | 3.00 | 2.60 | 1.50 | — |
| sodium caseinate | 2.10 | 0.30 | 1.30 | — | 1.80 | 1.70 | 0.80 | — |
| fat-extracted soya flour | — | — | — | 1.80 | — | — | — | — |
| isolate of fish proteins | — | — | — | — | — | — | — | 3.00 |
| coconut stearins | 9.20 | 0.60 | 5.00 | — | — | — | 0.60 | 1.90 |
| palm oil | — | — | — | 4.60 | — | — | — | — |
| animal fat | — | — | — | — | 6.90 | — | — | — |
| peanut oil | — | — | — | — | — | 7.20 | — | — |
| refined coconut | — | — | — | — | — | — | 0.60 | — |
| glycerolacto palmitate | 1.50 | 0.20 | — | 0.90 | 1.50 | 1.42 | 0.30 | 0.20 |
| monoglycerides | — | — | 0.90 | — | — | — | — | — |
| polyoxyethylene sorbitan mono-oleate | — | — | — | — | 0.80 | 0.07 | — | — |
| soya lecithin | — | — | — | — | — | — | 0.19 | — |
| saccharose | 13.60 | 4.60 | — | 6.50 | 11.00 | 10.60 | 1.20 | 5.20 |
| glucose | — | — | 5.70 | 3.80 | — | — | — | — |
| potassium sorbate | 0.01 | 0.01 | — | — | 0.01 | 0.01 | 0.01 | 0.01 |
| vanilla flavouring | 0.09 | 0.09 | — | — | 0.09 | 0.09 | — | 0.09 |
| potassium chloride | — | — | — | — | — | 0.01 | — | — |
| water | 63.40 | 89.90 | 45.00 | 75.30 | 69.20 | 71.10 | 60.60 | 85.20 |
| calorie content of the cream per 100 g | 210 | 50 | 130 | 130 | 200 | 140 | 100 | 60 |

EXAMPLES 1 AND 2, 4 TO 6 AND 8

The cocoa cakes are dry, fat-extracted cakes containing from 10 to 12% of residual fats, from 1 to 2% of cellulose and sugars, from 10 to 15% of proteins and from 70 to 80% of amylaceous materials.

EXAMPLES 3 AND 8

The fruit purees (banana and prune) contain approximately 25% of dry materials distributed in a ratio of approximately 50:50 between the amylaceous materials and sugars (saccharose and fructose).

EXAMPLES 1 TO 3 AND 5 TO 7

The skimmed milk contains approximately 55% of lactose and 35% of proteins.

EXAMPLE 4

The fat-extracted soya flour is a flour containing approximately 95% of proteins.

EXAMPLE 8

The isolate of fish proteins is a fat-extracted and deodorised isolate containing 4% of water and approximately 80% of proteins, the rest being ash.

EXAMPLE 5

The animal fat may be beef fat, especially the fat known as "first juice", lard or butter.

I claim:

1. A process for the production of an edible cream of low calorie content and a viscosity of 1.6 to 2.1 poises, wherein an aqueous medium containing from 50 to 90% by weight of water and, based on dry materials, from 10 to 35% by weight of amylaceous materials, at least 5% by weight of proteins and at least 5% by weight of fats, of which at least 1% are emulsifying fats, is homogenized under a pressure of at least 100 atmospheres, after which the homogenisate obtained is heated at a temperature in the range from 80° C to 130° C for a period of at least 10 minutes.

2. A process as claimed in claim 1, wherein the aqueous medium contains sugars.

3. A process as claimed in claim 1 wherein the aqueous medium contains at least one of the group consisting of flavourings, colorants, fruits in particulate form and mineral substances.

4. A process as claimed in claim 1 wherein the aqueous medium contains a preservative.

5. A process as claimed in claim 1 wherein the amylaceous materials are selected from cocoa cakes or fruit purees.

6. A process as claimed in claim 1 wherein the proteins are selected from skimmed milk powder, sodium caseinate, fat-extracted soya flour or the isolates of fish proteins.

7. A process as claimed in claim 1 wherein the fats are selected from the group consisting of coconut stearins, refined coconut, vegetable oils and animal fats.

8. A process as claimed in claim 1 wherein the emulsifying fats are selected from the group consisting of monoglycerides, glycerolactopalmitate and lecithins.

9. A process as claimed in claim 2, wherein the sugar are selected from the group consisting of saccharose, glucose, fructose and lactose.

10. A process as claimed in claim 2, wherein the aqueous medium contains from 50 to 90% by weight of water and, based on dry materials, from 10 to 35% by weight of amylaceous materials, from 5 to 25% by weight of proteins, from 5 to 35% by weight of fats, of which 1 to 11% are emulsifying fats, and from 20 to 55% by weight of sugars.

11. A process as claimed in claim 4 wherein the aqueous medium contains from 50 to 90% by weight of water and, based on dry materials, from 10 to 35% by weight of amylaceous materials, from 5 to 25% by weight of proteins, from 5 to 35% by weight of fats, of which 1 to 11% are emulsifying fats, and from 20 to 55% by weight of sugars, and potassium sorbate in quantities of from 100 to 400 ppm based on dry materials.

12. A process as claimed in claim 1 wherein the aqueous medium is homogenised at a temperature above 60° C.

13. A process as claimed in claim 1 wherein the homogenisate is heated for 12 minutes at a temperature of 115° C.

14. A process as claimed in claim 13, wherein the homogenisate is heated in containers.

15. An edible cream obtained by the process claimed in claim 1.

16. A process as claimed in claim 2 wherein the aqueuos medium contains at least one of the group consisting of flavourings, colorants, fruits in particulate form and mineral substances.

17. A process as claimed in claim 2 wherein the aqueous medium contains a preservative.

18. A process as claimed in claim 2 wherein the aqueous medium is homogenized at a temperature above 60° C.

19. A process as claimed in claim 2 wherein the homogenisate is heated for 12 minutes at a temperature of 115° C.

20. An edible cream obtained by the process claimed in claim 2.